(12) United States Patent
Lin et al.

(10) Patent No.: US 9,857,850 B2
(45) Date of Patent: Jan. 2, 2018

(54) TOUCH PANEL AND COVER STRUCTURE THEREOF

(71) Applicant: TPK Touch Solutions (Xiamen) Inc., Xiamen (CN)

(72) Inventors: Qunfeng Lin, Xiamen (CN); Wenxin Ye, Xiamen (CN); Huilin Ye, Zhangzhou (CN); Zhuanyuan Zhang, Zhangzhou (CN)

( * ) Notice: Subject to any disclaimer, the term of this patent is extended or adjusted under 35 U.S.C. 154(b) by 466 days.

(21) Appl. No.: 14/256,994

(22) Filed: Apr. 21, 2014

(65) Prior Publication Data

US 2014/0322492 A1 Oct. 30, 2014

(30) Foreign Application Priority Data

Apr. 24, 2013 (CN) .......................... 2013 1 0145039

(51) Int. Cl.
*G06F 3/041* (2006.01)
*G06F 3/044* (2006.01)
(Continued)

(52) U.S. Cl.
CPC ................ *G06F 1/181* (2013.01); *G06F 1/16* (2013.01); *G06F 1/1628* (2013.01);
(Continued)

(58) Field of Classification Search
CPC ........... G06F 3/044; G06F 2203/04107; G06F 2203/04111; G06F 3/041
(Continued)

(56) References Cited

U.S. PATENT DOCUMENTS 8,634,039 B2 * 1/2014 Lai .................... G02F 1/133512
345/173
2008/0158173 A1 * 7/2008 Hamblin ............... G06F 1/1626
345/173
(Continued)

FOREIGN PATENT DOCUMENTS

CN 102591503 A * 7/2012
CN 202533918 U * 11/2012
WO WO 2013035276 A1 * 3/2013

OTHER PUBLICATIONS

Machine translation of CN 202533918 U, obtained using Google Patent on Sep. 2, 2016.*
(Continued)

*Primary Examiner* — Aaron Austin
*Assistant Examiner* — Zheren J Yang (57) ABSTRACT

A cover structure of a touch panel includes a cover plate, a patterned shielding layer, and a decoration layer. The cover plate has a visible region and a peripheral region including a mark region. The patterned shielding layer is disposed on the cover plate, and the patterned shielding layer is disposed in the peripheral region. The patterned shielding layer includes at least one hollow structure disposed in the mark region. A circumscribed region surrounding the hollow structure is defined in the mark region. A frame edge of the circumscribed region overlaps a most prominent circumscribed edge of the hollow structure. The decoration layer is disposed in the peripheral region and covers the hollow structure. An area of the decoration layer is larger than an area of the circumscribed region. A shape of the decoration layer corresponds to a shape of the frame edge of the circumscribed region.

18 Claims, 10 Drawing Sheets

(51) Int. Cl.
  *G06F 1/18* (2006.01)
  *H04M 1/02* (2006.01)
  *H05K 5/00* (2006.01)
  *G06F 1/16* (2006.01)

(52) U.S. Cl.
  CPC ....... *H04M 1/0249* (2013.01); *H04M 1/0266* (2013.01); *H04M 1/0283* (2013.01); *H05K 5/0017* (2013.01); *G06F 2203/04107* (2013.01); *G06F 2203/04809* (2013.01); *Y10T 428/24562* (2015.01)

(58) Field of Classification Search
  USPC .......................................................... 345/174
  See application file for complete search history.

(56) References Cited

U.S. PATENT DOCUMENTS

| | | | | |
|---|---|---|---|---|
| 2009/0085885 | A1* | 4/2009 | Wu | G06F 3/041 345/173 |
| 2009/0160824 | A1* | 6/2009 | Chih-Yung | G06F 3/044 345/175 |
| 2010/0112293 | A1* | 5/2010 | Li | H05K 5/0243 428/161 |
| 2010/0271329 | A1* | 10/2010 | Oohira | G02F 1/13338 345/174 |
| 2011/0193789 | A1* | 8/2011 | Lin | G06F 3/045 345/173 |
| 2011/0234507 | A1* | 9/2011 | Chou | G06F 3/044 345/173 |
| 2012/0113042 | A1* | 5/2012 | Bayramoglu | G06F 3/044 345/174 |
| 2012/0146921 | A1* | 6/2012 | Park | G06F 3/044 345/173 |
| 2012/0154312 | A1* | 6/2012 | Huang | G06F 3/044 345/173 |
| 2012/0274602 | A1* | 11/2012 | Bita | G02B 26/001 345/174 |
| 2013/0016052 | A1* | 1/2013 | Lien | G06F 3/044 345/173 |
| 2013/0038545 | A1* | 2/2013 | Hsu | G06F 3/041 345/173 |
| 2013/0082961 | A1* | 4/2013 | Wang | G06F 3/044 345/173 |
| 2013/0106739 | A1* | 5/2013 | Lee | G06F 3/044 345/173 |
| 2013/0257237 | A1* | 10/2013 | Cao | B32B 15/08 312/204 |
| 2013/0279089 | A1* | 10/2013 | Chien | H05K 13/00 361/679.01 |
| 2014/0014400 | A1* | 1/2014 | Mori | B29C 45/1418 174/254 |
| 2014/0043246 | A1* | 2/2014 | Hsueh | G06F 3/041 345/173 |
| 2014/0054156 | A1* | 2/2014 | Chang | H03K 17/9622 200/600 |
| 2014/0063361 | A1* | 3/2014 | Lo | G06F 1/16 349/12 |
| 2014/0071064 | A1* | 3/2014 | Cho | G06F 3/044 345/173 |
| 2014/0166451 | A1* | 6/2014 | Lin | G06F 3/044 200/266 |
| 2014/0168535 | A1* | 6/2014 | Lin | G06F 1/169 349/12 |
| 2014/0225843 | A1* | 8/2014 | Kuo | G06F 3/0412 345/173 |
| 2014/0300835 | A1* | 10/2014 | Chu | G06F 3/0412 349/12 |
| 2014/0307184 | A1* | 10/2014 | Hsieh | G06F 3/044 349/12 |
| 2014/0340364 | A1* | 11/2014 | Tang | G06F 3/042 345/175 |
| 2014/0354591 | A1* | 12/2014 | Chu | G06F 3/044 345/174 |
| 2015/0002761 | A1* | 1/2015 | Tsurusaki | G06F 1/1643 349/12 |

OTHER PUBLICATIONS

Machine translation of CN 102591503 A, obtained using Google Patent.*

* cited by examiner

TOUCH PANEL AND COVER STRUCTURE THEREOF

BACKGROUND OF THE INVENTION

The present invention claims the priority of China Patent Application No. 201310145039.8 filed on Apr. 24, 2013, which is incorporated by reference in the present application in its entirety.

FIELD OF THE INVENTION

The present invention relates to a touch sensing technology, and more particularly, to a touch panel and a cover structure of the touch panel.

DESCRIPTION OF THE PRIOR ART

The touch panel has been widely used in the input interfaces of the instruments for its properties such as the diversification for design and the interaction between machines and humans. In recent years, touch functions are integrated with display units, and consumer electronics, such as mobile phones, GPS navigator systems, tablet computers and laptop computers, are employed with touch display panels.

Figure 1:
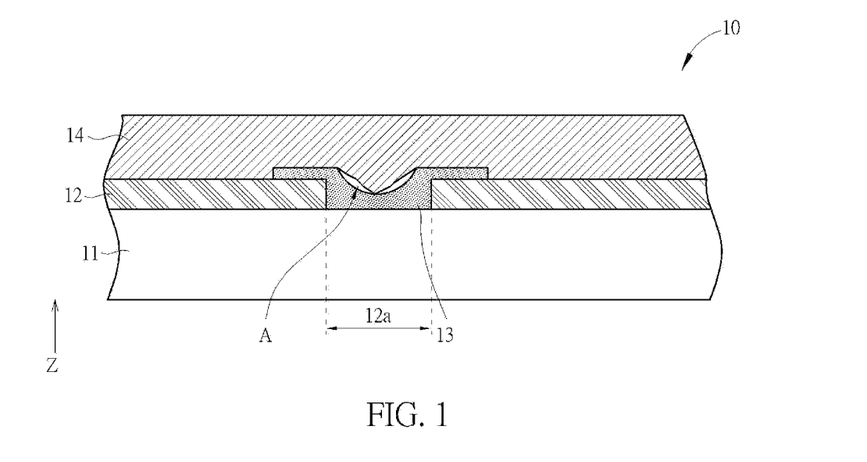
FIG. 1 is a schematic diagram illustrating a conventional cover structure of a touch panel.
Figure 2:
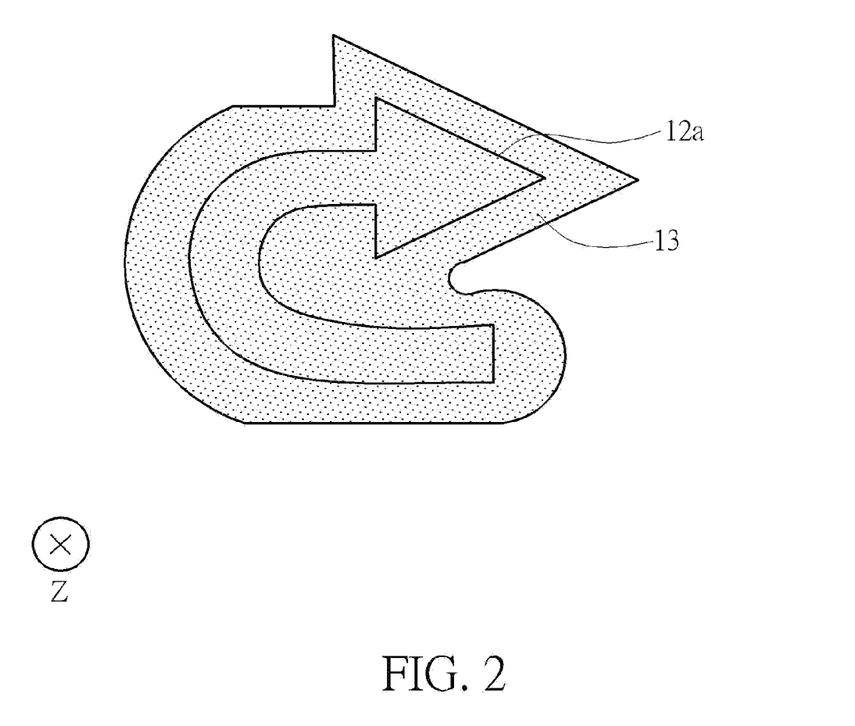
FIG. 2 is a top-view schematic diagram illustrating a conventional a shielding layer defining a recess in which an icon or logo is formed.

In the above-mentioned consumer electronics, a cover plate is generally included in the touch panel. A visible region, which corresponds to a display panel, and a peripheral region surrounding the visible region are defined on the cover plate. A patterned shielding layer is generally formed on the peripheral region of the cover plate so as to shield visible signal lines in the touch panel. Please refer to FIG. 1 and FIG. 2. FIG. 1 is a schematic diagram illustrating a conventional cover structure 10 of a touch panel. FIG. 2 is a top-view schematic diagram illustrating a conventional recess of a shielding layer. As shown in FIG. 1, a recess 12a is generally formed in a patterned shielding layer 12 on a cover plate 11. As shown in FIG. 2, the recess 12a is shaped to define a common logo or a icon, such as a return icon, within the patterned shielding layer 12. More specifically, a decoration layer 13 having a shape similar to the recess 12a is formed at the position of the recess 12a so as to present a designed decorative pattern and a visual color effect from the pattern shielding layer 12.

A part of the decoration layer 13 is disposed on the cover plate 11 and the other part of the decoration layer 13 is disposed on the patterned shielding layer 12 because the decoration layer 13 has a substantial thickness and is formed according to the shape of the recess 12a. Therefore, the surface of the patterned shielding layer 12 will be rough and uneven. For example, a concave surface of the decoration layer 13 is formed at the position of the recess 12a, and a raised surface of the decoration layer 13 is formed above the patterned shielding layer 12.

When the surface of the patterned shielding layer 12 becomes rough and uneven due to the decoration layer 13 having an irregular shape similar to that of the recess 12a, a solid optical clear adhesive (OCA) 14, which is used in combination process, can not smoothly cover the cover structure 10. A part of the solid optical clear adhesive 14 will fall into the concave part of the decoration layer 13, and air bubbles A will be generated at the concave part of the decoration layer 13. The air bubbles A are visible in a region corresponding to the recess 12a, and the appearance quality of the touch panel 10 may be affected accordingly.

BRIEF SUMMARY OF THE INVENTION

A cover structure of a touch panel is provided in a preferred embodiment of the present invention. The cover structure of the touch panel includes a cover plate, a patterned shielding layer and a decoration layer. The cover plate has a visible region and a peripheral region adjacent to at least one edge of the visible region. The peripheral region includes a mark region. The patterned shielding layer is disposed on the cover plate and in the peripheral region. The patterned shielding layer defines at least one recess disposed in the mark region, and a circumscribed region surrounding the recess is defined in the mark region. A frame edge of the circumscribed region overlaps a most prominent circumscribed edge of the recess. The decoration layer is disposed in the peripheral region and covering the recess. An area of the decoration layer is larger than an area of the circumscribed region, and a shape of the decoration layer corresponds to a shape of the frame edge of the circumscribed region.

A touch panel is provided in a preferred embodiment of the present invention. The touch panel includes a substrate, the cover structure described above and a solid adhesion layer. A touch sensing unit is formed on the substrate. The solid adhesion layer is disposed between the substrate and the cover structure.

A touch panel is provided in another preferred embodiment of the present invention. The touch panel includes a cover plate, a patterned shielding layer, a touch sensing unit and a decoration layer. The cover plate has a visible region and a peripheral region adjacent to at least one edge of the visible region. The peripheral region comprises a mark region. The patterned shielding layer is disposed on the cover plate and in the peripheral region. The patterned shielding layer defines at least one recess disposed in the mark region, and a circumscribed region surrounding the recess is defined in the mark region. A frame edge of the circumscribed region overlaps a most prominent circumscribed edge of the recess. The touch sensing unit is disposed on the cover plate and in the recess. The decoration layer is disposed in the peripheral region. The decoration layer is disposed on the touch sensing unit in the recess. An area of the decoration layer is larger than an area of the circumscribed region, and a shape of the decoration layer corresponds to a shape of the frame edge of the circumscribed region.

The problem of uneven solid optical clear adhesive happened in the process of forming the solid optical clear adhesive may be improved by employing the cover structure of the present invention. The amount of air bubble points, which are generated at concave positions of the decoration layer filled with the solid optical clear adhesive, may be reduced, and the appearance quality of the product may be improved accordingly.

These and other objectives of the present invention will no doubt become obvious to those of ordinary skill in the art after reading the following detailed description of the preferred embodiment that is illustrated in the various figures and drawings.

DETAILED DESCRIPTION OF INVENTION

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Please note that the figures are only for illustration and the figures may not be to scale. Additionally, the terms such as "first" and "second" in this context are only used to distinguish different components and do not constrain the order of generation.

Figure 3:
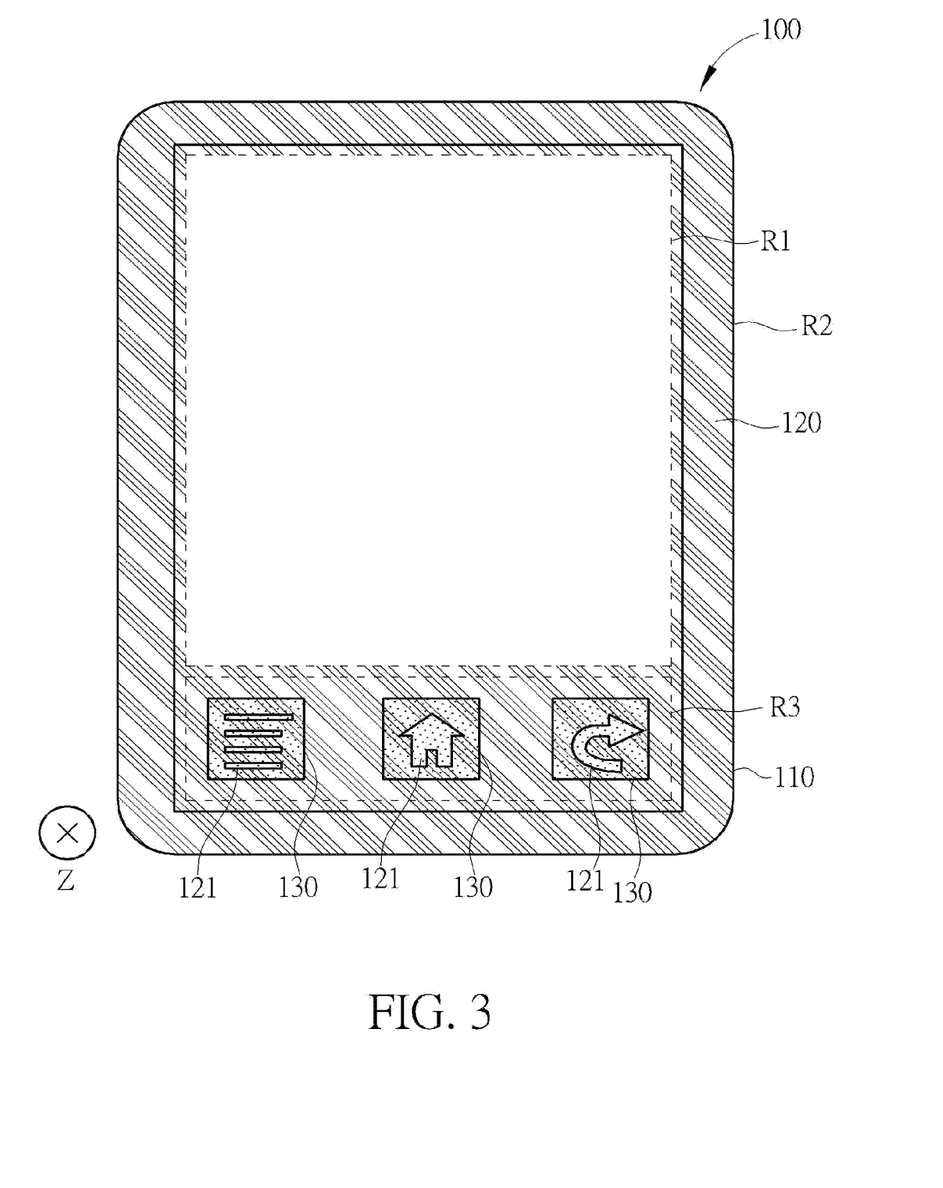
FIG. 3 is a top-view diagram illustrating a cover structure of a touch panel according to a first preferred embodiment of the present invention.
Figure 4:
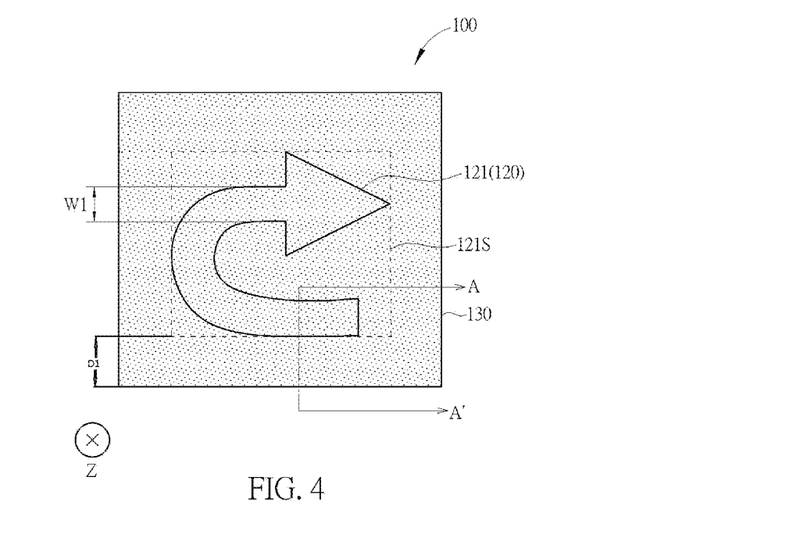
FIG. 4 is a locally enlarged diagram of FIG. 3.

Please refer to FIG. 3 and FIG. 4. FIG. 3 is a top-view diagram illustrating a cover structure of a touch panel according to a first preferred embodiment of the present invention. FIG. 4 is a locally enlarged diagram of FIG. 3. Please note that the figures are only for illustration and the figures may not be to scale. The scale may be further modified according to different design considerations. A cover structure 100 of a touch panel in this embodiment includes a cover plate 110, a patterned shielding layer 120 and a decoration layer 130. The cover plate 110 has a visible region (a boundary of which is defined by the reference character R1) and a peripheral region (an inner boundary of which is defined by the reference character R1 and an outer boundary of which is defined by the reference character R2) adjacent to at least one edge of the visible region (a boundary of which is defined by the reference character R1). The peripheral region (an inner boundary of which is defined by the reference character R1 and an outer boundary of which is defined by the reference character R2) includes a mark region (a boundary of which is defined by the reference character R3). The patterned shielding layer 120 is disposed on the cover plate 110 and in the peripheral region (an inner boundary of which is defined by the reference character R1 and an outer boundary of which is defined by the reference character R2). The patterned shielding layer 120 defines at least one recess 121 disposed in the mark region (a boundary of which is defined by the reference character R3), and a circumscribed region 121S (as shown in FIG. 4) surrounding the recess 121 is defined in the mark region (a boundary of which is defined by the reference character R3). A frame edge of the circumscribed region 121S overlaps a most prominent circumscribed edge of the recess 121. The decoration layer 130 is disposed in the peripheral region (an inner boundary of which is defined by the reference character R1 and an outer boundary of which is defined by the reference character R2) and covering the recess 121. An area of the decoration layer 130 is larger than an area of the circumscribed region 121S, and a shape of the decoration layer 130 corresponds to a shape of the frame edge of the circumscribed region 121S (as shown in FIG. 4). More specific descriptions will be contained in the following content.

In this embodiment, the cover plate 110 may preferably include a solid substrate, such as a cover glass, a flexible substrate, such as a plastic substrate, or other appropriate cover plates made of transparent materials. The cover plate 110 may be flat, curved or a combination such as a 2.5D glass. The peripheral region (an inner boundary of which is defined by the reference character R1 and an outer boundary of which is defined by the reference character R2) is disposed on at least one side of the visible region (a boundary of which is defined by the reference character R1). In this embodiment, the peripheral region (an inner boundary of which is defined by the reference character R1 and an outer boundary of which is defined by the reference character R2) surrounds the visible region (a boundary of which is defined by the reference character R1), but the present invention is not limited thereto.

The pattern shielding layer 120 in this embodiment may preferably be a patterned shielding layer made of ink or color resists, but not limited thereto. More specifically, the patterned shielding layer 120 having the recesses 121 defined therein may be formed by a printing process when the material of the patterned shielding layer 120 is ink. The patterned shielding layer 120 having the recesses 121 defined therein may be formed by photolithography processes when the material of the patterned shielding layer 120 is a color resist. The decoration layer 130 is disposed on the peripheral region (an inner boundary of which is defined by the reference character R1 and an outer boundary of which is defined by the reference character R2) and in the recess 121 so as to present required appearance and color effects at a location of the recess 121.

Please refer to FIG. 4. The frame edge of the circumscribed region 121S surrounding the recess 121 overlaps the most prominent circumscribed edge of the recess 121. The shape of the circumscribed region 121S is a quadrangle, such as a rectangle. Each side of the circumscribed region 121S is connected to an outmost edge of the recess 121 along each direction. The recess 121 has a minimum width W1, a first distance D1 is a distance between an edge of the decoration layer 130 and a corresponding edge of the circumscribed region 121S. In this embodiment, the circumscribed region 121S is regarded as a rectangle for further descriptions, but the present invention is not limited to this.

In other preferred embodiment of the present invention, the circumscribed region 121S is in other shapes, such as a circle, an ellipse, a polygon, or other appropriate shapes may also be used to modify the size of the decoration layer 130. Additionally, the first distance D1 is preferably longer than or equal to 1.5 times of the minimum width W1. For instance, the first distance D1 is preferably longer than 0.15 millimeter (mm) when the minimum width W1 of the recess 121 is equal to 0.1 mm. It is worth noting that, when the minimum width W1 of the recess 121 is shorter than 0.1 mm, the first distance D1 is preferably equal to 0.15 mm so as to keep a specific area of the decoration layer 130 for the successive adhesion process.

Figure 5:
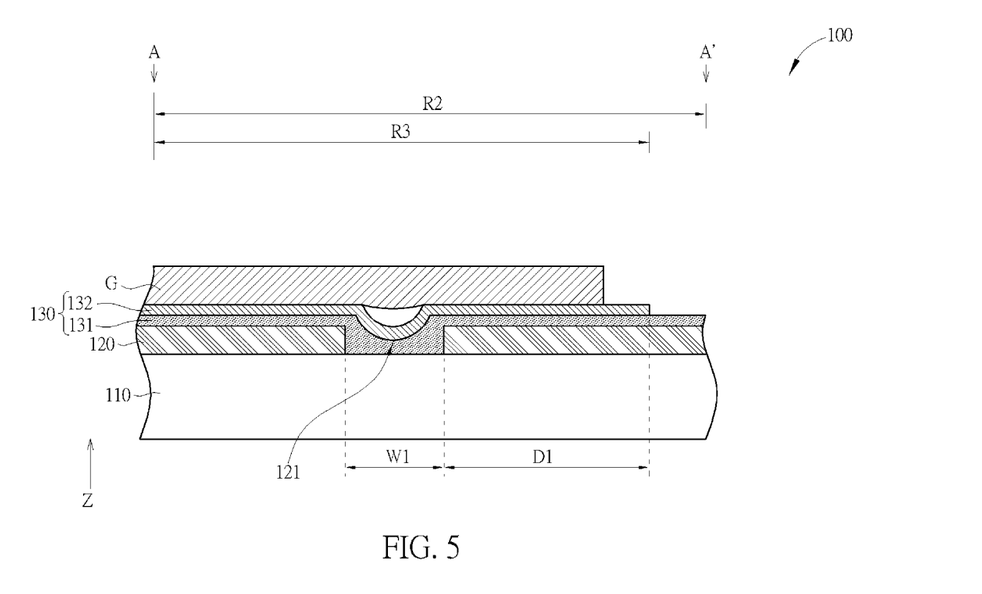
FIG. 5 is a cross-sectional view diagram taken along a cross-sectional line A-A' in FIG. 4.
Figure 6:
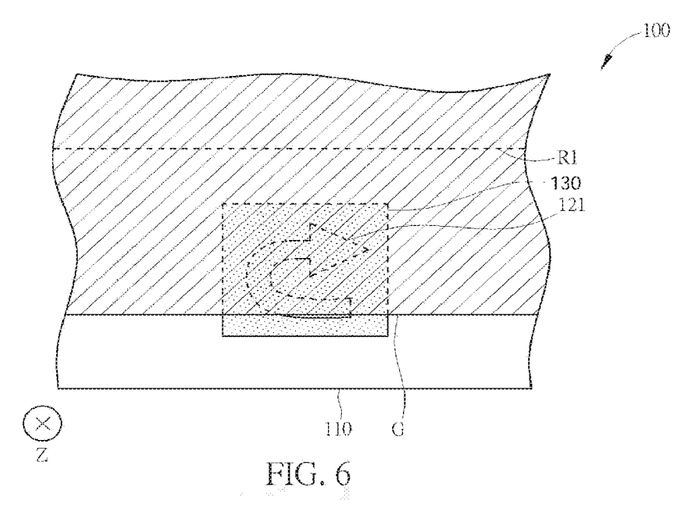
FIG. 6 is a top-view diagram of FIG. 5, where a patterned shielding layer 120 has been removed for clarity.

Please refer to FIG. 5. FIG. 5 is a cross-sectional view diagram taken along a cross-sectional line A-A' in FIG. 4. As shown in FIG. 5, for further description about the application of the cover structure 100 of the touch panel in the present invention, the cover structure 100 may be further combined with a solid adhesion layer G. The solid adhesion layer G is disposed on the decoration layer 130. The solid adhesion layer G may include a solid optical clear adhesive. Please refer to FIG. 6. FIG. 6 is a top-view diagram of FIG. 5. As shown in FIG. 6, dashed lines illustrate outer contours of the components covered by the solid adhesion layer G, the dashed lines in the following figures may also be interpreted in this way and will not be described repeatedly.

As shown in FIG. 5, the decoration layer 130 may preferably include a laminated structure of an effect layer 131 and a color layer 132, but the present invention is not limited to this. In other preferred embodiment of the present invention, the decoration layer 130 may also be a single-layered structure. The effect layer 131 may be a translucent ink material, and the color layer 132 may be a mirror silver material, but not limited thereto. The effect layer 131 and the color layer 132 may be other appropriate materials for generating visual effects. In addition, a range of the color layer 132 is preferably smaller than that of the effect layer 131, and the color layer 132 is preferably kept in the range of the effect layer 131, but not limited thereto.

The solid adhesion layer G may preferably expose a part of the decoration layer 130. As shown in FIG. 6, at least one edge of the decoration layer 130 may be exposed by the solid adhesion layer G so as to exhaust gaseous materials, which are possibly generated in the process of forming the solid adhesion layer G, more easily along the surface of the decoration layer 130. In another preferred embodiment of the present invention, the solid adhesion layer G may also completely cover the decoration layer 130. It should be easy to realize that the appearance defect of the air bubble points may be improved in the present invention as the solid adhesion layer G may be formed more smoothly and be kept away from the recess 121 in the process of forming the solid adhesion layer G. In addition, because the decoration layer 130 in the present invention has larger area and a shape of a regular quadrangle (such as a rectangle), gaseous materials are tend to accumulate at the recess 121.

The following description will detail the different embodiments of the present invention. To simplify the description, identical components in each of the following embodiments are marked with identical symbols. For making it easier to understand the differences between the embodiments, the following description will detail the dissimilarities among different embodiments and the identical features will not be described repeatedly.

Figure 7:
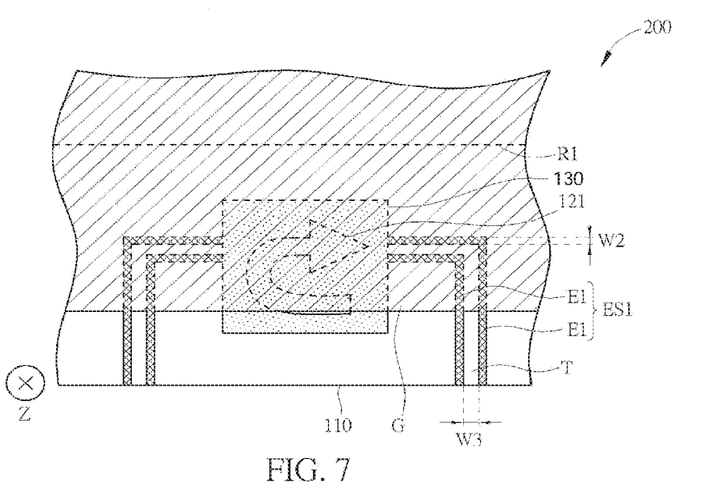
FIG. 7 is a schematic diagram illustrating a cover structure of a touch panel according to a second preferred embodiment of the present invention, where a patterned shielding layer 120 has been removed for clarity.

Please refer to FIG. 7. FIG. 7 is a schematic diagram illustrating a cover structure of a touch panel according to a second preferred embodiment of the present invention. As shown in FIG. 7, the difference between a cover structure 200 in this embodiment and the first preferred embodiment detailed above is that the cover structure 200 further includes an exhaust structure ES1. The exhaust structure ES1 is disposed on at least one side of the decoration layer 130. In this embodiment, the exhaust structure ES1 extends toward outside of at least one edge of the solid adhesion layer G. More specifically, the exhaust structure ES1 in this embodiment may include two exhaust strips E1 disposed adjacently with each other so as to form an exhaust trench T between the two adjacent exhaust strips E1. One end of each exhaust strip E1 is connected to the decoration layer 130, and the other end of each exhaust strip E1 extends toward outside of the edge of the solid adhesion layer G. In addition, a trench width W3 of the exhaust trench is larger than 1.5 times of a width W2 of each exhaust strip E1, but not limited thereto. It is worth noting that the exhaust strips E1 and the decoration layer 130 are preferably made of the same material and formed by an identical process step so as to simplify the related process, but not limited thereto. In other preferred embodiments of the present invention, the exhaust strips E1 and the decoration layer 130 may also be formed separately. Additionally, when the exhaust strips E1 are formed by a printing process, the trench width W3 is preferably as wide as the sum of 1.5 times of the width W2 and a printing process tolerance for better exhaust performance, but not limited thereto. In this embodiment, the exhaust strip E1 is preferably an L-shaped exhaust strip, but the present invention is not limited to this. In other preferred embodiments of the present invention, the exhaust strips in other shapes may also be used to generate the required exhaust effects.

Figure 8:
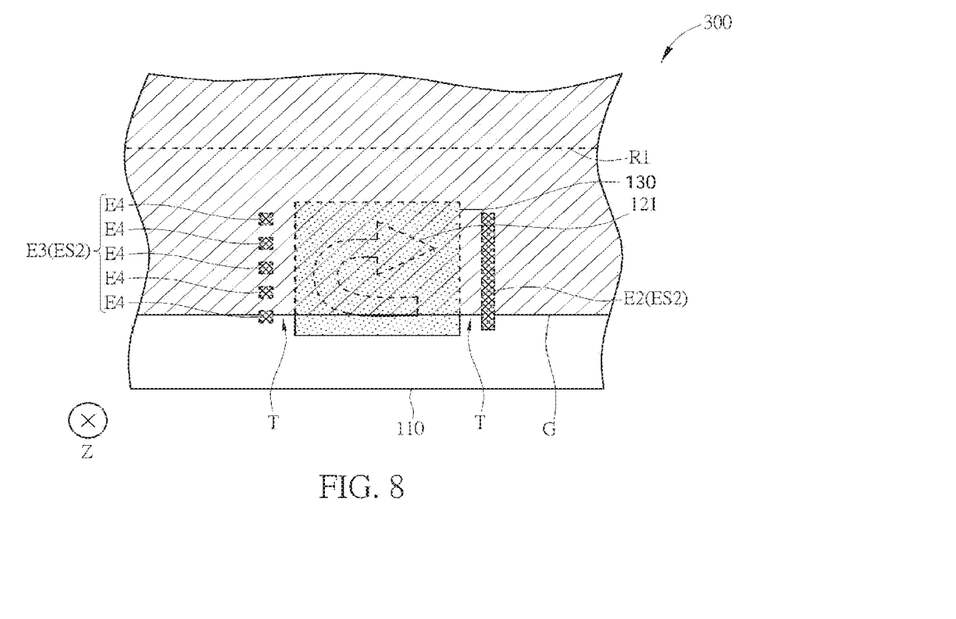
FIG. 8 is a schematic diagram illustrating a cover structure of a touch panel according to a third preferred embodiment of the present invention, where a patterned shielding layer 120 has been removed for clarity.

Please refer to FIG. 8. FIG. 8 is a schematic diagram illustrating a cover structure of a touch panel according to a third preferred embodiment of the present invention. As shown in FIG. 8, the difference between a cover structure 300 in this embodiment and the first preferred embodiment detailed above is that the cover structure 300 further includes an exhaust structure ES2 disposed on at least one side of the decoration layer 130. The exhaust structure ES2 extends toward outside of at least one edge of the solid adhesion layer G. More specifically, the exhaust structure ES2 in this embodiment may include at least one exhaust lump disposed on at least one side of the decoration layer 130. In this embodiment, an exhaust lump E2 and an exhaust lump E3 are disposed adjacent to the decoration layer 130 so as to form exhaust trenches T with the corresponding edges of the decoration layer 130 respectively. It is worth noting that at least one edge part of the exhaust lump E2 extends toward outside of the solid adhesion layer G, and the exhaust lump E2 is a continuous stripe structure. In addition, the exhaust lump E3 is composed of a plurality of exhaust pads E4 separately disposed and aligned with one another. In this embodiment, at least one of the exhaust pads E4 extends toward outside of the solid adhesion layer G. It is worth noting that the exhaust lump E2, the exhaust pads E4 and the decoration layer 130 are preferably made of the same material and formed by an identical process step so as to simplify the related process, but not limited thereto. In other preferred embodiments of the present invention, the exhaust lump E2, the exhaust pads E4 and the decoration layer 130 may also be formed separately.

Figure 9:
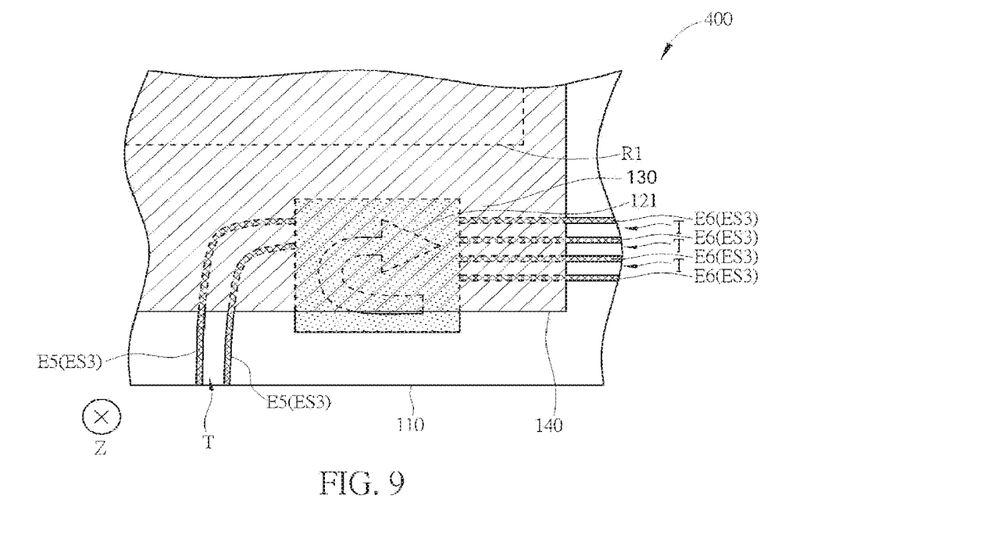
FIG. 9 is a schematic diagram illustrating a cover structure of a touch panel according to a fourth preferred embodiment of the present invention, where a patterned shielding layer 120 has been removed for clarity.

Please refer to FIG. 9. FIG. 9 is a schematic diagram illustrating a cover structure of a touch panel according to a fourth preferred embodiment of the present invention. As shown in FIG. 9, the difference between a cover structure 400 in this embodiment and the first preferred embodiment detailed above is that the cover structure 400 further includes an exhaust structure ES3 disposed on at least one side of the decoration layer 130. The exhaust structure ES3 extends toward outside of at least one edge of the solid adhesion layer G. More specifically, the exhaust structure ES3 in this embodiment may include a plurality of exhaust strips E5 and a plurality of exhaust strips E6. Each of the exhaust strips E5 may be a curved exhaust strip, and an exhaust trench T is formed between two adjacent curved exhaust strips E5. Additionally, each of the exhaust strips E6 may be a straight exhaust strip, and an exhaust trench T is formed between two adjacent straight exhaust strips E6. It is worth noting that the shapes of the exhaust strips in the exhaust structure ES3 may be modify so as to extend toward outside of different edges of the solid adhesion layer G, and the exhaust performance may be further improved accordingly.

Figure 10:
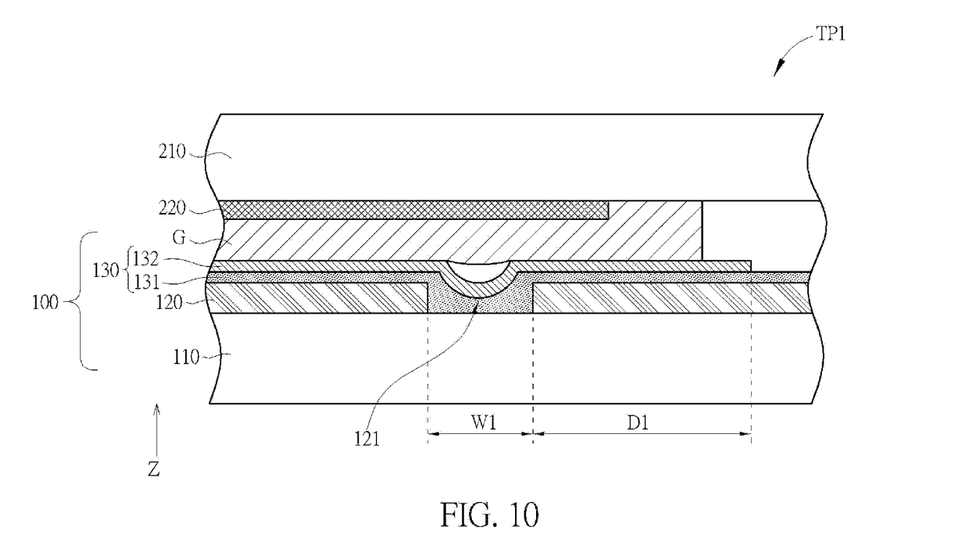
FIG. 10 is a schematic diagram illustrating a touch panel employing the cover structure of the present invention.

Please refer to FIG. 10. FIG. 10 is a schematic diagram illustrating a touch panel employing the cover structure of the present invention. As shown in FIG. 10, a touch panel TP2 in this embodiment includes a substrate 210 and the cover structure 100. A touch sensing unit 220 is formed on the substrate 210. The characteristics of the cover structure 100 are detailed above and will not be described repeatedly. The touch sensing unit 220 is preferably formed on the substrate 210 first, and the solid adhesion layer G is used to combine the substrate 210 and the cover plate 110 with the patterned shielding layer 120 and the decoration layer 130 disposed on. The solid adhesion layer G is disposed on the decoration layer 130 of the cover structure 100. In this embodiment, the touch sensing unit 220 is formed on one side of the substrate 210, and a single-layered touch electrode structure may be employed in the touch sensing unit 220. For example, a plurality of electrodes may be interlaced with one another and electrically isolated from one another by an insulation layer.

Figure 11:
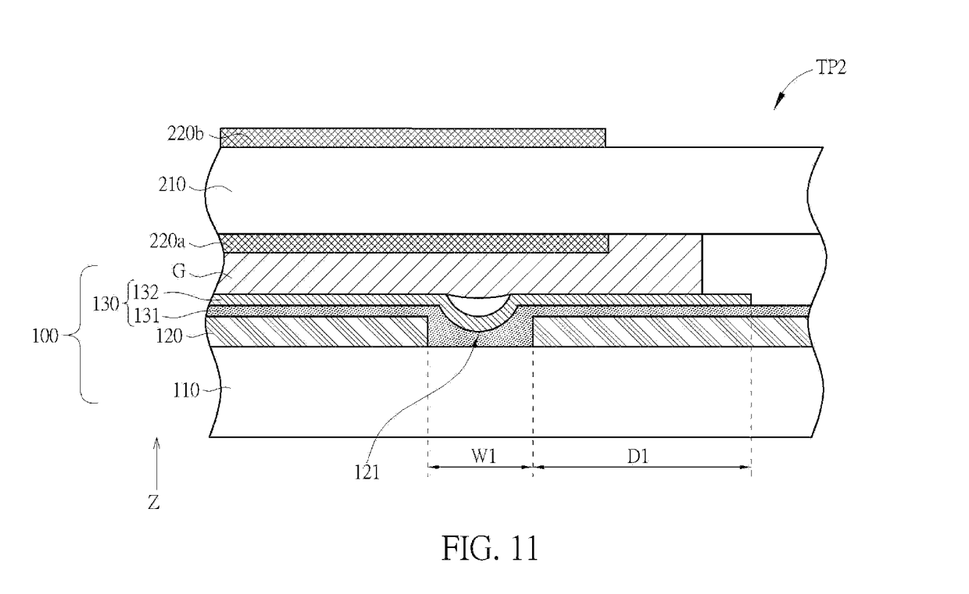
FIG. 11 is a schematic diagram illustrating another touch panel employing the cover structure of the present invention.

However, it should be obvious to one having ordinary skill in the related technology that the touch sensing unit may also be disposed on two sides of the substrate 210. Please refer to FIG. 11. In a touch panel TP 2 of another preferred embodiment, a touch sensing unit 220*a* and a touch sensing unit 220*b* are formed on two sides of the substrate 210 respectively. The touch sensing unit 220*a* and the touch sensing unit 220*b* may be a plurality of horizontal electrodes and a plurality of vertical electrodes respectively. The substrate 210 and the cover plate 110 may be made of the same material. In one preferred embodiment, the substrate 210 may include a solid substrate, such as a glass substrate or a ceramic substrate, or a flexible substrate, such as a plastic substrate or other substrates made of appropriate materials.

Figure 12:
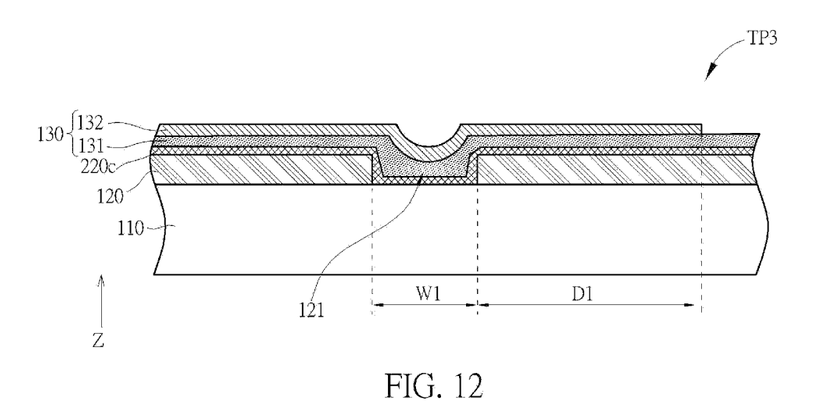
FIG. 12 is a schematic diagram illustrating further another touch panel employing the cover structure of the present invention.
Figure 13:
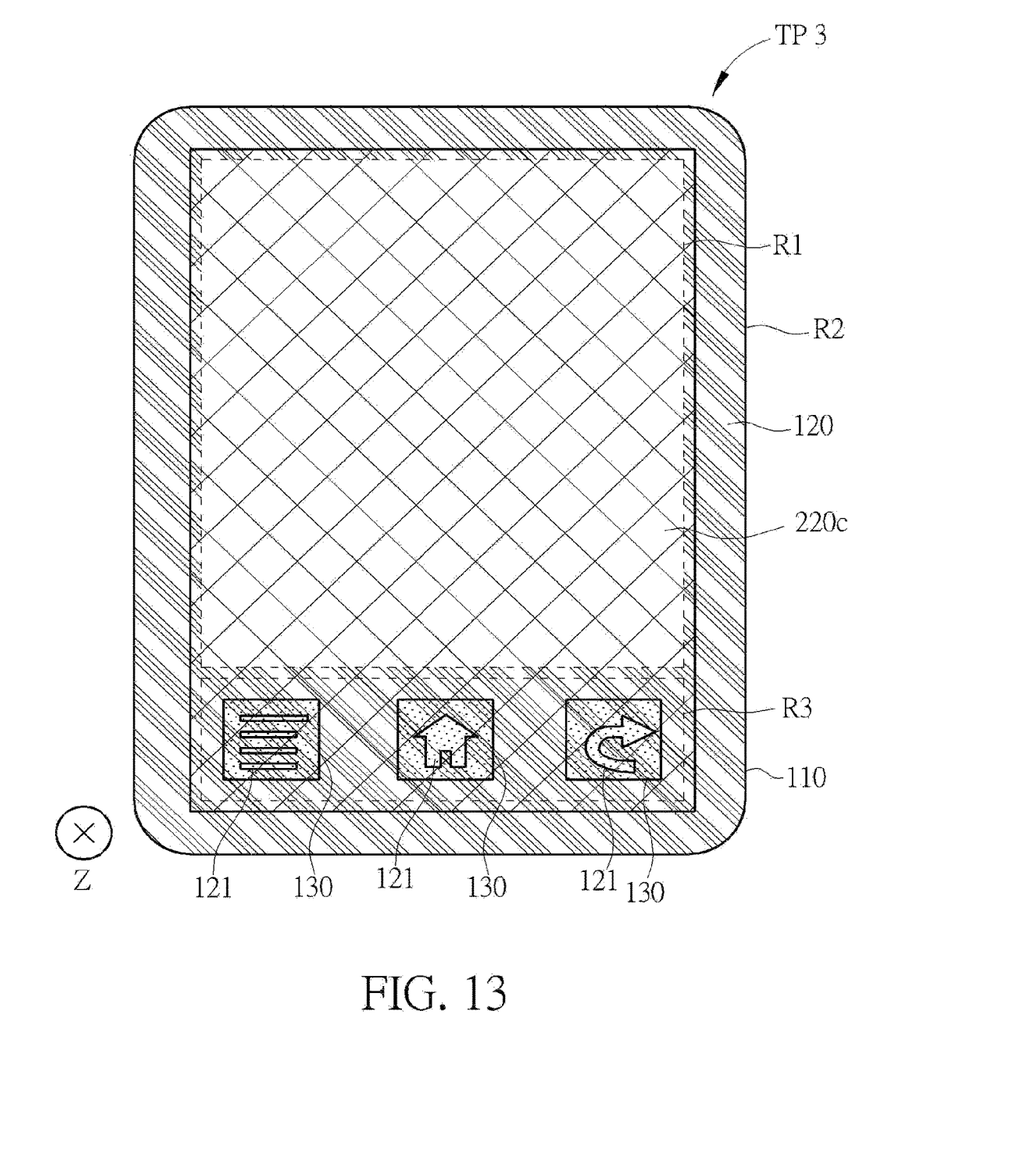
FIG. 13 is a top-view diagram of FIG. 12.

Please refer to FIG. 12, FIG. 13 and FIG. 4. FIG. 12 is a schematic diagram illustrating further another touch panel employing the cover structure of the present invention. FIG. 13 is a top-view diagram of FIG. 12. In a touch panel TP3, a touch sensing unit 220*c* is directly formed on the cover plate 110. More specifically, the touch panel TP3 includes the cover plate 110, the patterned shielding layer 120, the touch sensing unit 220*c* and the decoration layer 130. The cover plate 110 has the visible region (a boundary of which is defined by the reference character R1) and the peripheral region (an inner boundary of which is defined by the reference character R1 and an outer boundary of which is defined by the reference character R2) adjacent to at least one edge of the visible region (a boundary of which is defined by the reference character R1). The peripheral region (an inner boundary of which is defined by the reference character R1 and an outer boundary of which is defined by the reference character R2) includes the mark region (a boundary of which is defined by the reference character R3). The patterned shielding layer 120 is disposed on the cover plate 110 and in the peripheral region (an inner boundary of which is defined by the reference character R1 and an outer boundary of which is defined by the reference character R2). The patterned shielding layer 120 includes at least one recess 121 disposed in the mark region (a boundary of which is defined by the reference character R3), and a circumscribed region 121S (as shown in FIG. 4) surrounding the recess 121 is defined in the mark region (a boundary of which is defined by the reference character R3). A frame edge of the circumscribed region 121S overlaps a most prominent circumscribed edge of the recess 121. The touch sensing unit 220*c* is disposed on the cover plate 110 and in the recess 121. The decoration layer 130 is disposed in the peripheral region (an inner boundary of which is defined by the reference character R1 and an outer boundary of which is defined by the reference character R2). The decoration layer 130 is disposed on the touch sensing unit 220*c* and in the recess 121. An area of the decoration layer 130 is larger than an area of the circumscribed region 121S, and a shape of the decoration layer 130 corresponds to a shape of the frame edge of the circumscribed region 121S.

In this embodiment, a specific high temperature condition in an ordinary sputtering process and erosive liquid etchant in a photo etching process are required to form the touch sensing unit 220*c*. The high temperature condition and the erosive liquid etchant are harmful to the components already formed before the process of forming the touch sensing unit 220*c*. Accordingly, the touch sensing unit 220*c* in this embodiment is formed in the recess 121 before the process of forming the decoration layer 130, and that will be beneficial for the material variety of the decoration layer 130. Ink materials are generally used to form the decoration layer 130 by printing processes, and no special conditions or chemicals are required. Therefore, the already formed components will not be damaged by the process of forming the decoration layer 130.

Figure 14:
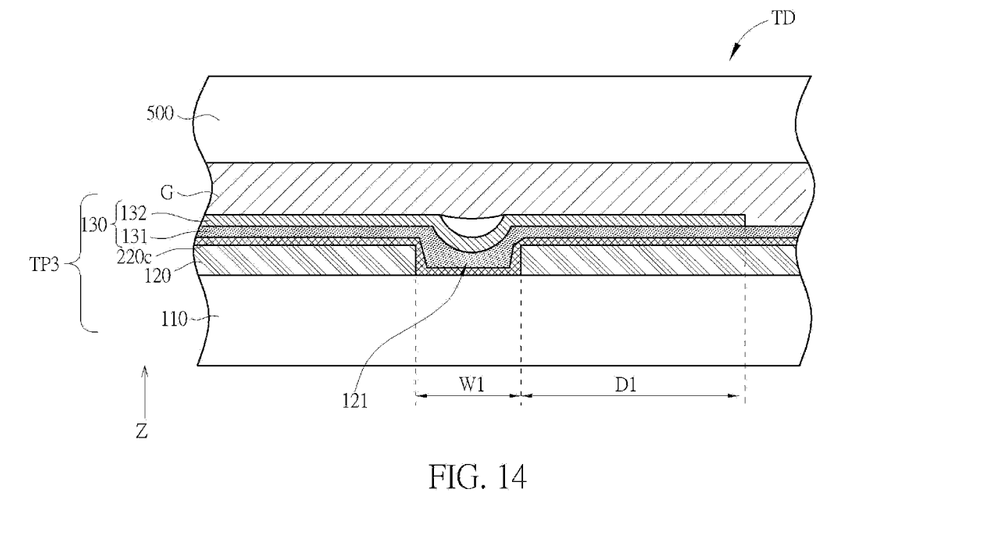
FIG. 14 is a schematic diagram illustrating a touch device employing the touch panel of FIG. 12.

Please refer to FIG. 14. FIG. 14 is a schematic diagram illustrating a touch device TD employing the touch panel TP3 of FIG. 12. As shown in FIG. 14, in the touch device TD, the touch panel TP3 and a display panel 500 are connected by the solid adhesion layer G.

It is worth noting that the touch panel TP1, the touch panel TP2 and the touch panel TP3 described above may also employ the cover structures in FIGS. 7-9.

To summarize the above descriptions, in the cover structure of the touch panel in the present invention, the area and the size of the decoration layer disposed in the recess and around the recess are modified so as to provide a relatively smooth platform for forming the solid adhesion layer. The air bubbles issue, which happened in an area corresponding to the recess during the conventional adhesion process may be improved, and the appearance quality of the product may be enhanced accordingly.

In addition, the solid adhesion layer may only partially cover the decoration layer so as to exhaust the gaseous material more easily in the adhesion process. The exhaust structure is also employed in the present invention and disposed adjacent to the decoration layer so as to exhaust the air more effectively. The appearance quality may be further enhanced accordingly.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A cover structure of a touch panel, comprising:
a cover plate having a visible region and a peripheral region adjacent to at least one edge of the visible region;
a patterned shielding layer disposed on the cover plate in the peripheral region and surrounding the visible region, wherein the patterned shielding layer defines a recess formed into a first shape;
a decoration layer comprising a first layer and a second layer and disposed in the peripheral region, wherein:
the first layer and the second layers are disposed in the recess defined by the patterned shielding layer and overlie the patterned shielding layer,
the second layer is located between the patterned shielding layer and the first layer,
the first layer has an upper surface facing away from the second layer, and
a portion of the upper surface of the first layer overlying the recess is concave and extends into the recess; and
a solid adhesive layer disposed on the first layer, wherein the solid adhesive layer covers a perimeter of the first layer in a first direction and leaves a portion of the perimeter of the first layer exposed in a second direction.

2. The cover structure of claim 1, wherein:
the recess has a minimum width, and
a distance between the perimeter of the decoration layer and a location of the recess closest to the perimeter of the decoration layer is at least 1.5 times greater than the minimum width.

3. The cover structure of claim 2, wherein the distance is equal to 0.15 millimeter (mm) when the minimum width of the recess is less than 0.1 mm.

4. The cover structure of claim 1, wherein the second layer is an effect layer and the first layer is a color layer.

5. The cover structure of claim 1, further comprising an exhaust structure disposed adjacent a perimeter of the second layer and between the patterned shielding layer and the solid adhesive layer, wherein the second layer and the exhaust structure are made of a same material.

6. The cover structure of claim 5, wherein:
the exhaust structure comprises at least two exhaust strips spaced apart to define an exhaust trench,
the patterned shielding layer defines a bottom surface of the exhaust trench,
a first exhaust strip of the at least two exhaust strips defines a first sidewall of the exhaust trench,
a second exhaust strip of the at least two exhaust strips defines a second sidewall of the exhaust trench, and
the solid adhesive layer defines a top surface of the exhaust trench.

7. The cover structure of claim 6, wherein a width of the exhaust trench is at least 1.5 times greater than a width of each of the at least two exhaust strips.

8. The cover structure of claim 5, wherein the exhaust structure comprises at least one exhaust lump.

9. The cover structure of claim 8, wherein the exhaust lump is a continuous stripe structure.

10. The cover structure of claim 1, wherein the solid adhesive layer is in contact with a top surface of the first layer.

11. The cover structure of claim 1, wherein, within the recess, the second layer extends from a top surface of the patterned shielding layer to a bottom surface of the patterned shielding layer.

12. The cover structure of claim 1, wherein:
the first shape is non-symmetrical,
the decoration layer is disposed in the peripheral region to define a second shape, and
the second shape is symmetrical.

13. A touch panel, comprising:
the cover structure of claim 1; and
a substrate, wherein:
a touch sensing unit is formed on the substrate, and
the solid adhesion layer is disposed between the substrate and the upper surface of the first layer of the cover structure.

14. The touch panel of claim 13, wherein the touch sensing unit is disposed on one side or two sides of the substrate.

15. A touch panel, comprising:
a cover plate having a visible region and a peripheral region adjacent to at least one edge of the visible region;
a patterned shielding layer disposed on the cover plate in the peripheral region, wherein the patterned shielding layer defines a recess formed into a first shape;
a touch sensing unit disposed in the recess defined by the patterned shielding layer and overlying the patterned shielding layer;
a decoration layer comprising a first layer and a second layer and disposed in the peripheral region, wherein:
the first layer and the second layer are disposed in the recess defined by the patterned shielding layer and overlie the touch sensing unit,
the second layer is located between the touch sensing unit and the first layer,
the first layer has an upper surface facing away from the second layer, and
a portion of the upper surface of the first layer overlying the recess is concave and extends into the recess;
an exhaust structure disposed adjacent a perimeter of the second layer, wherein the second layer and the exhaust structure are made of a same material; and
a solid adhesive layer disposed on the first layer, wherein the solid adhesive layer covers a perimeter of the first layer in a first direction and leaves a portion of the perimeter of the first layer exposed in a second direction.

16. The touch panel of claim 15, wherein the decoration layer is spaced apart from the solid adhesive layer in the recess by a gap.

17. The touch panel of claim 15, wherein the touch sensing unit is in contact with a top surface of the cover plate and a top surface of the patterned shielding layer.

18. The touch panel of claim 17, wherein the first layer is in contact with a top surface of the touch sensing unit.

* * * * *